INVENTOR
Howard D. Colman
BY
ATTORNEYS

July 21, 1931.  H. D. COLMAN  1,815,397
MOTOR DRIVEN OPERATOR
Original Filed Feb. 5, 1927  7 Sheets-Sheet 3

INVENTOR
Howard D. Colman
BY
ATTORNEYS

July 21, 1931.   H. D. COLMAN   1,815,397
MOTOR DRIVEN OPERATOR
Original Filed Feb. 5, 1927   7 Sheets-Sheet 4
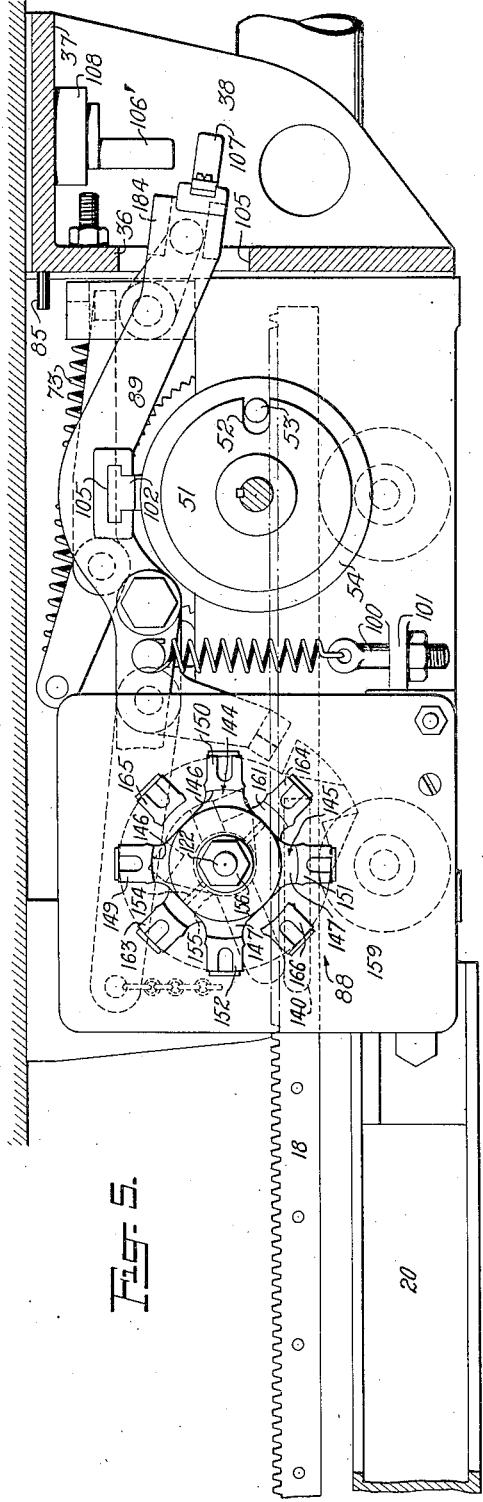
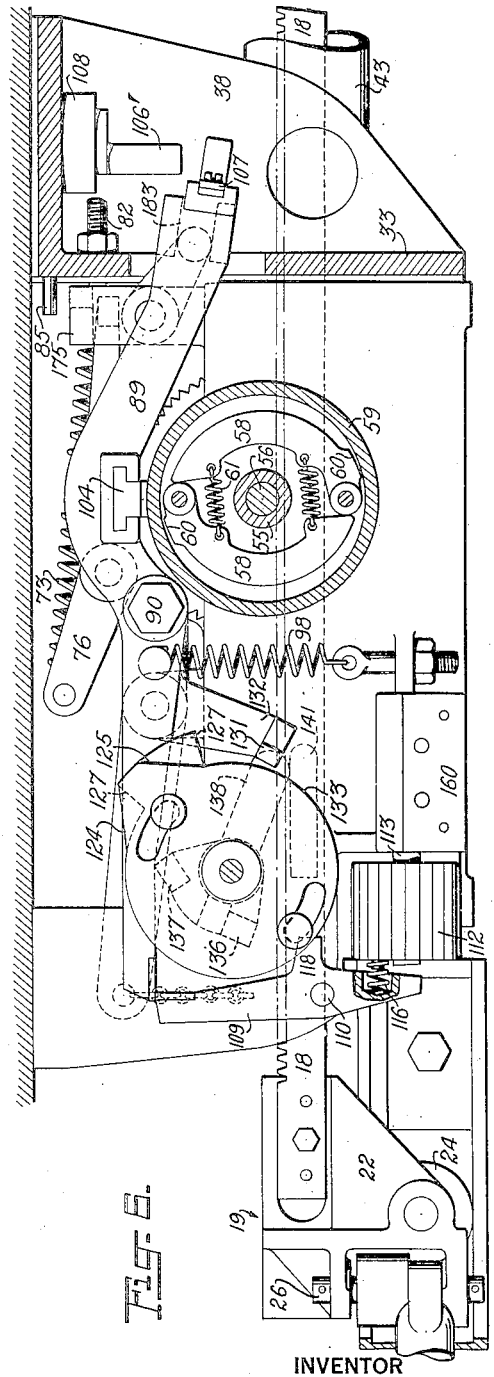
INVENTOR
Howard D. Colman.
BY
ATTORNEYS July 21, 1931.  H. D. COLMAN  1,815,397
MOTOR DRIVEN OPERATOR
Original Filed Feb. 5, 1927   7 Sheets-Sheet 5
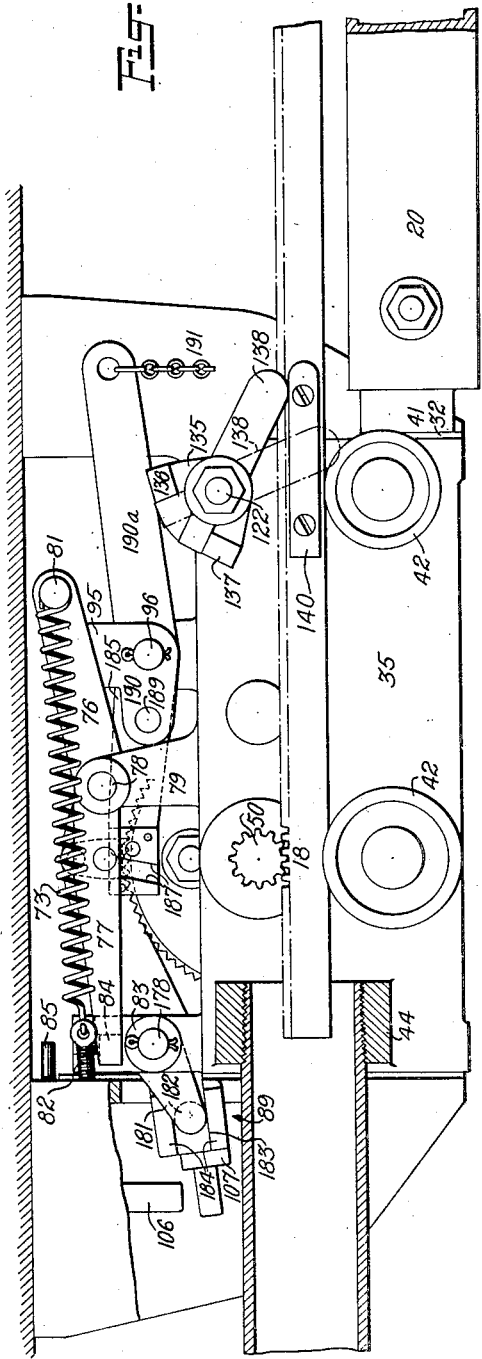
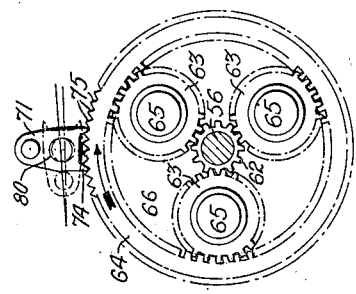
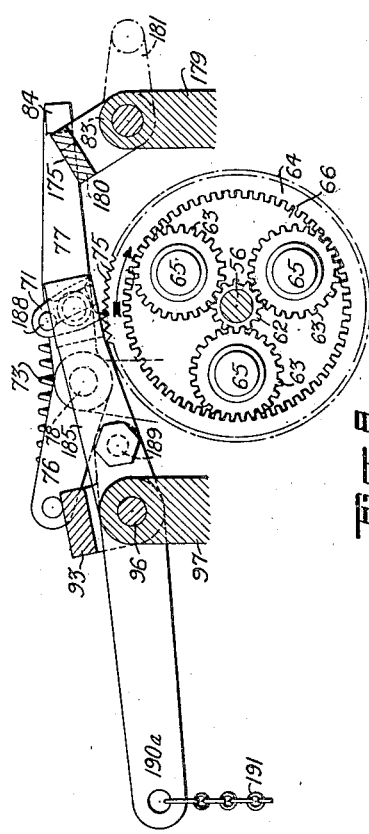
INVENTOR
Howard D. Colman
BY
ATTORNEYS July 21, 1931.                H. D. COLMAN                1,815,397
                          MOTOR DRIVEN OPERATOR
                    Original Filed Feb. 5, 1927    7 Sheets-Sheet 6
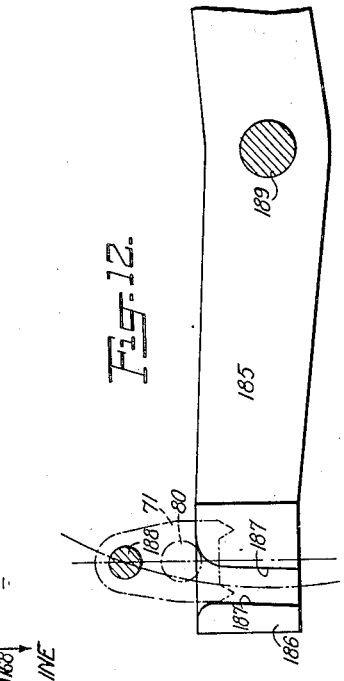
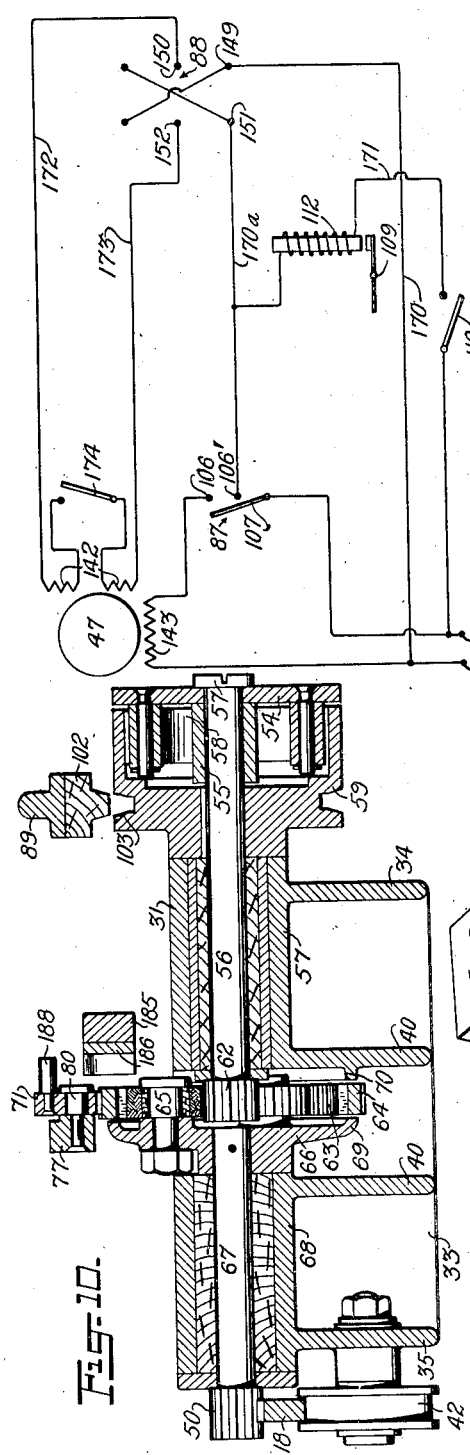
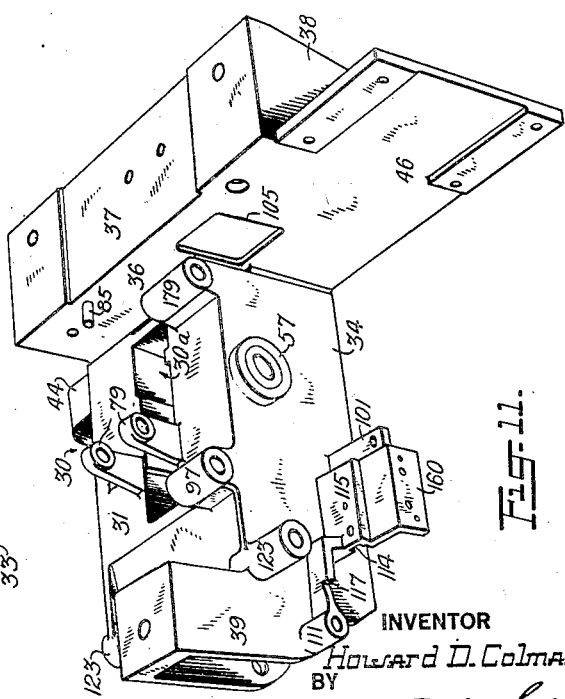
INVENTOR
Howard D. Colman
BY
ATTORNEYS.

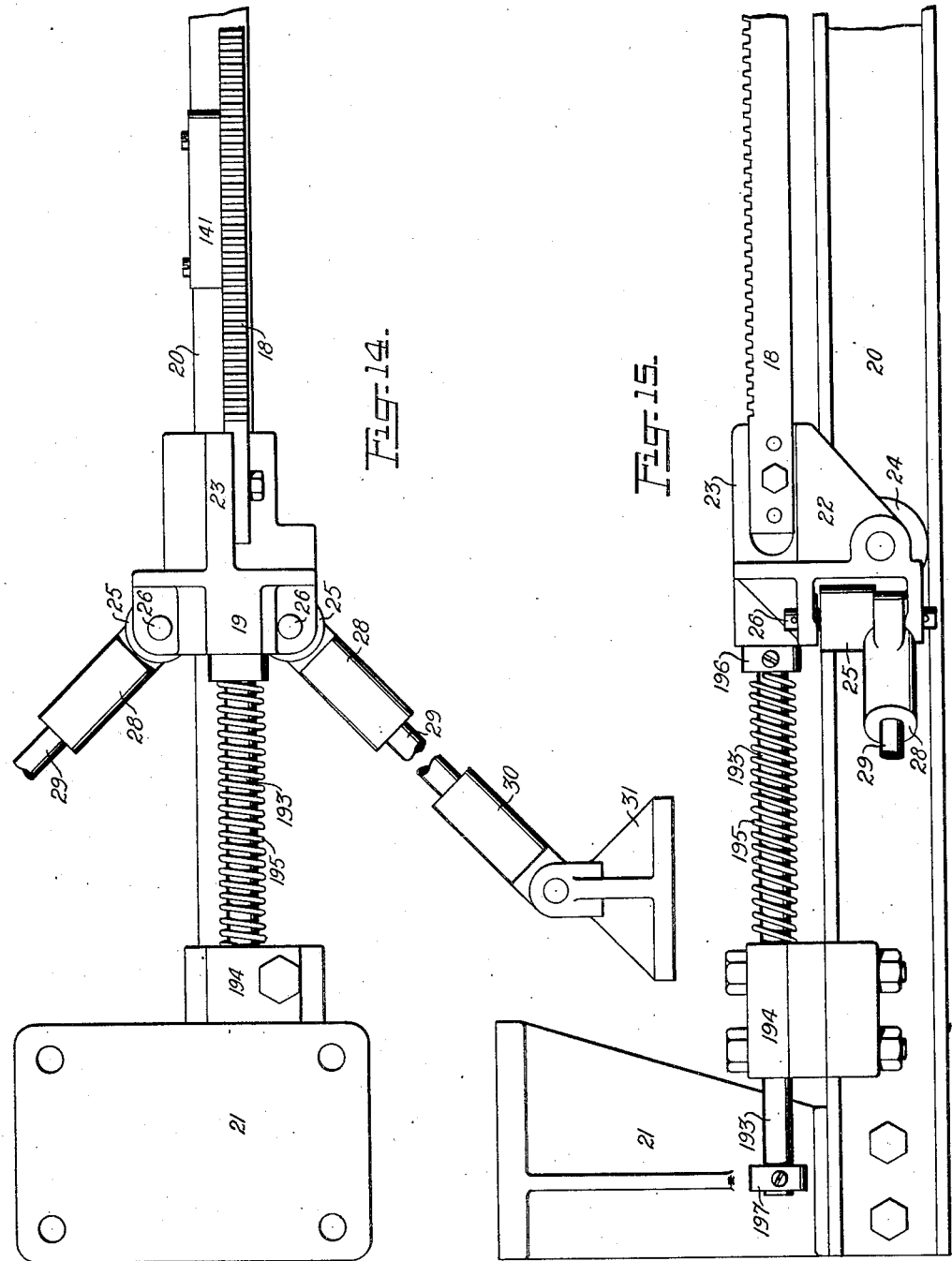

Patented July 21, 1931

1,815,397

UNITED STATES PATENT OFFICE

HOWARD D. COLMAN, OF ROCKFORD, ILLINOIS

MOTOR DRIVEN OPERATOR

Application filed February 5, 1927, Serial No. 166,086. Renewed January 15, 1931.

This invention is directed to motor driven operators, and has particular reference to such a mechanism adapted to operate from rest position, in successive cycles to impart predetermined movements to a door or other object.

A general object of the invention is to provide an operator of the character referred to which is efficient and reliable in operation and which is constructed with the parts compactly arranged and so coordinated structurally and functionally as to form a unitary device of thoroughly practical character and of extremely simple and inexpensive construction.

An important object of the present invention resides in the provision of a motor driven power unit for operating a closure member having a novel overload release device associated therewith and operable automatically to completely free the closure member for movement independently of the motor whenever an obstruction or other abnormal condition is encountered in either the opening or the closing cycle which sets up a predetermined force in opposition to the motor.

The invention also contemplates the provision of a unitary power driving unit capable of use in operating outwardly swinging, inwardly swinging, sliding, multi-leaf or any other kind of doors or other closures.

Another object is to provide a power driven closure operator having an overload release device and a means for preventing operation of said device so as to cooperate with a brake device to lock the closure member against manual operation when in closed position.

Another object is to provide a door operator having a releasable control device for starting the operator and locking means for the door operatively associated with the said control device whereby the door will be unlocked before the operator is started.

Still another object is to provide an overload release device for door operators which may be reset in normal position either by hand or by merely moving the door into either of its limiting positions regardless of whether the driving means for the operator is running or not.

Other objects and advantages will be apparent from the following detailed description of the invention taken in connection with the accompanying drawings in which.

Figure 2:
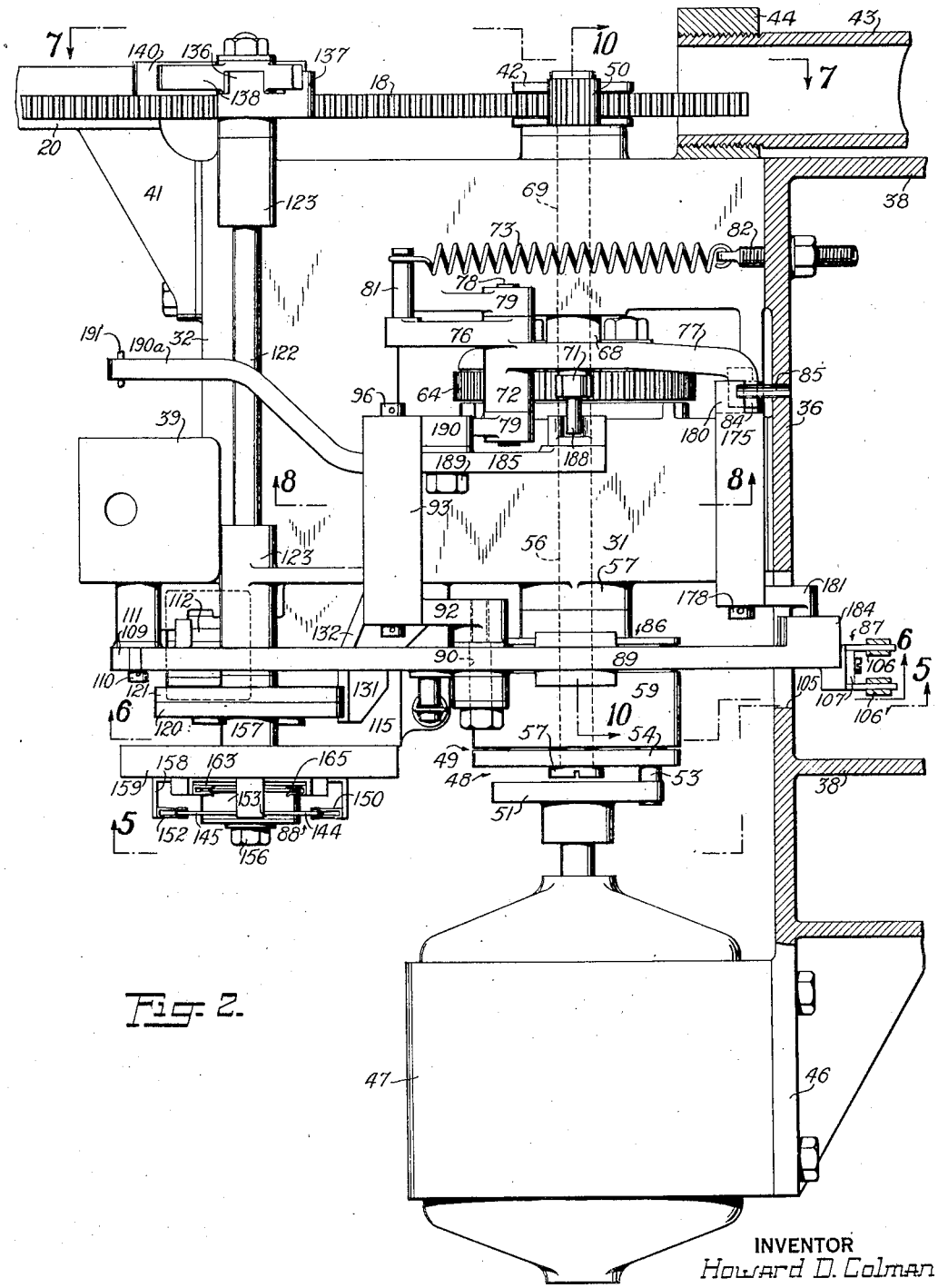
Fig. 2 is a fragmentary top plan view of the operator, a portion of the main frame member being shown in section.

Figs. 5, 6, 7, 8 and 10 are fragmentary sectional views taken along the lines 5—5, 6—6, 7—7, 8—8 and 10—10, respectively, of Fig. 2.

Fig. 9 is a detail view of the overload release device.

Fig. 11 is a perspective view of the main frame member.

Fig. 12 is a view illustrating how the overload release device is reset.

Fig. 13 is a theoretical wiring diagram.

Fig. 14 is a top plan view of the door operating connections.

Fig. 15 is a side elevational view of the mechanism shown in Fig. 14.

While I have shown in the drawings and will herein describe in detail the preferred embodiment of the invention, it is to be understood that I do not intend to be limited thereby to the particular form disclosed but aim to cover all modifications and alternative constructions falling within the spirit and scope of the invention as expressed in the appended claims.

In the embodiment of the invention chosen for purposes of illustration, the operator, which is shown as an assembled unit in Fig. 2, is arranged to operate alternately during successive operating cycles in opposite directions. Such an operator is particularly adapted to meet the requirements encountered in the operation of closure members such as heavy doors, and accordingly the invention will be thus described.

The invention in general

In its present application, the operator is driven by an alternating current motor and is constructed to operate through two cycles of equal length, one for moving the doors from closed to open position and the other for moving the doors from open to closed position. Each of these cycles is intended to be initiated under manual control by tripping a releasable control device which in its movement unlocks the doors, closes the main motor switch, and releases a brake. All these functions are performed substantially simultaneously and serve to start the motor so as to move the door in a direction which may be determined by appropriate means such as a reversing switch. Near the end of the cycle, the reversing means is actuated so as to condition the motor control circuits for the next cycle of operation; the control device is reset or prepared for proper operation during the remainder of that cycle and also in the succeeding cycle; the main motor switch is opened; the brake is applied; and the doors are locked against movement by hand.

The transmission of power from the motor to the doors is accomplished in the preferred embodiment, by means of a rack and pinion, the former being connected with the doors in a manner governed by the character thereof, and the latter being driven from the motor shaft by means including a centrifugal clutch and a reduction gear mechanism. This gear mechanism is of a character such as to constitute a differential drive which is utilized to provide for a release of the driving connection upon a condition of overload being encountered, the construction being such that release is effected equally well under suddenly or gradually applied loads.

The doors are locked in their closed position by a brake acting through the speed reduction gearing and by means which renders the overload release device associated with such gearing inoperative.

Door operating connections

Figure 1:
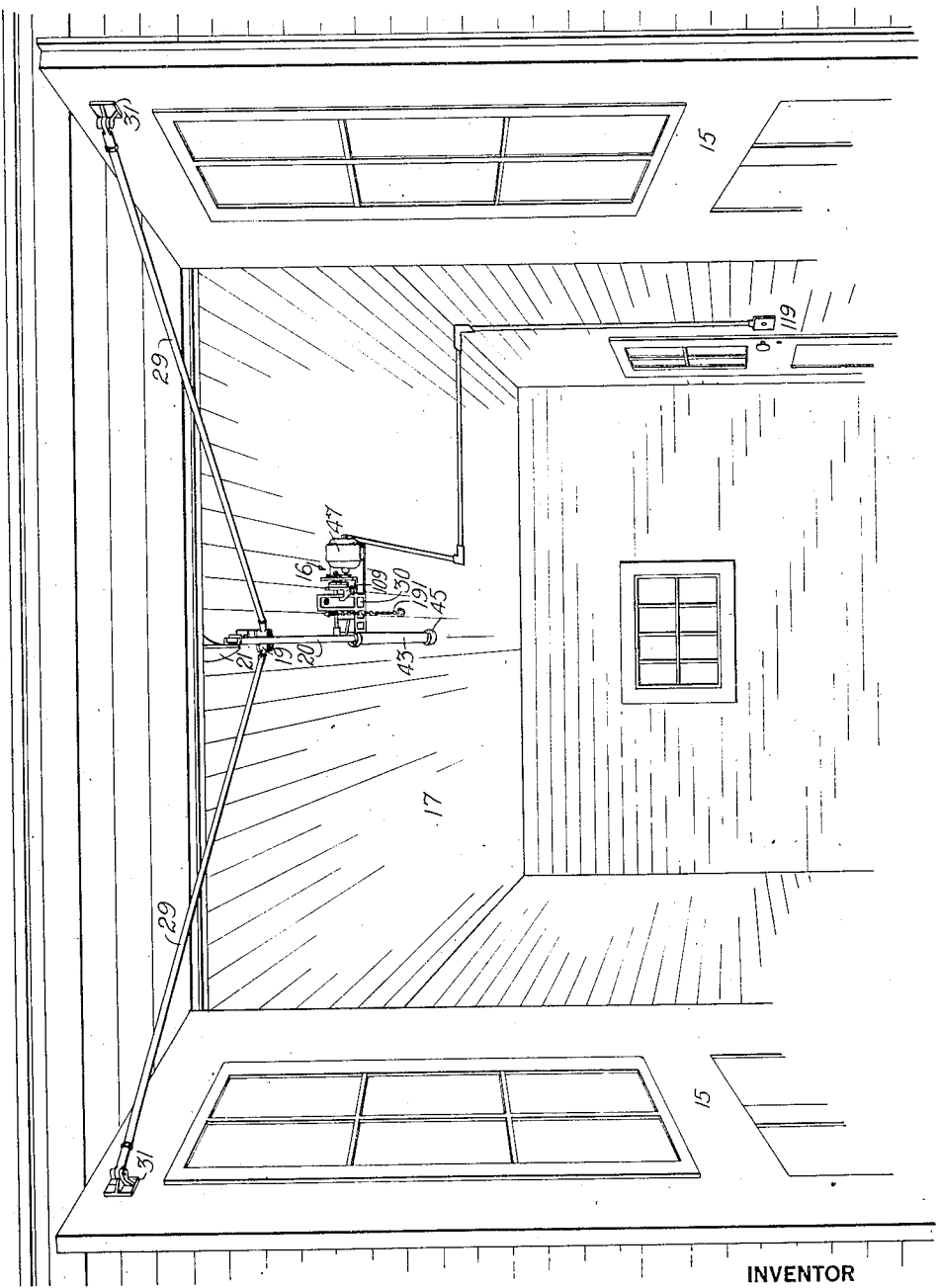
Figure 1 shows the room of a building having doors equipped for operation by my improved operator.

Referring now to Fig. 1 of the drawings, I have shown my invention as applied to a garage having two doors 15 of the outwardly swinging type. These doors are hinged to the vertical side edges of the door frame so as to close against the outer surface of said frame. When used on doors of this type, the driving unit designated generally by the numeral 16 and shown particularly in Figs. 1 and 2, is preferably mounted in substantially the same horizontal plane as the upper edge of the doorway, as for instance, on the ceiling 17 of the building, and is arranged to move an actuating member such as a rack bar 18 back and forth during successive operating cycles. The present actuating member is arranged to move in a direction perpendicular to the doorway and is operatively connected to each door thereby serving either to open or to close the doors during each operating stroke or cycle.

In the present instance, the actuating rack bar 18 is supported at its forward end and is guided in a direction perpendicular to the doorway by a car 19 mounted to travel along a horizontal trackway disposed a short distance below the level of the upper edge of the doorway. To provide such a trackway, a channel bar 20 is employed, this bar being supported at its forward end on the depending leg of a bracket member 21 which may be mounted on the ceiling 17 behind the doorway.

The car 19 is shown in Figs. 14 and 15 as comprising a U-shaped casting having depending legs 22 shaped to receive the channel bar 20 between them. The forward end of the rack bar 18 is bolted to the upper web portion 23 of the car above the channel bar. A roller 24 is mounted on the inner side of one leg 22 in position to ride along the lower flange of the channel and thereby support the car for free travel along the channel bar. To guide the car laterally, rollers 25 are arranged to bear against opposite side edges of the upper channel flange. These rollers are mounted on pins 26 secured between spaced lugs on the car, which pins also carry pivotal members 28 into which connecting rods 29 are threaded. At their forward ends each rod 29 threads into a member 30 which is pivoted on a bracket 31 fastened to one door (see Fig. 1) near the upper free corner thereof.

It will be observed that the parts thus far described including the rack bar 18, the car 19, and the rods 29 constitute a rigid operative connection by means of which a power driven element such as a pinion may be utilized for driving the rack bar 18 and thereby effectually opening and closing outwardly swinging doors. Connections having various other types of movements would necessarily be provided to meet the operating requirements of other types of doors when it is desired to operate such other doors by means of the universal driving unit which will now be described.

The driving unit

The driving unit which is arranged herein to reciprocate the rack bar 18 and thereby close and open the doors, comprises an electric motor operatively connected to the rack bar, a mechanism for controlling the starting, stopping and reversing of the motor, and a combined overload release device and means for locking the doors against movement. All of these parts are compactly arranged and mounted on a main frame member 30 (see Fig. 11). This frame member is shown herein as comprising a single rectangularly-shaped casting having a top plate 31 and front, rear and side flanges 32, 33, 34 and 35 respectively, depending from the plate 31. Integrally formed along the rear edge of the casting and extending laterally therefrom an upstanding plate 36 terminating in a horizontal ledge 37. The plate and ledge are reinforced by webs 38 and constitute a bracket by means of which the casting may be secured against the ceiling 17. A similar but narrower bracket 39 supports the frame member 30 from its front end. The frame casting is reinforced by ribs 40 connecting its front and rear flanges (see Fig. 10).

The main frame member may serve as a stationary support for the channel bar 20 and the rack bar 18. For this purpose, the rear end of the channel bar is bolted to a bracket 41 (see Fig. 2) projecting forwardly from the front flange 32. The rack bar is arranged to ride in the grooves of supporting rollers 42 mounted on the side wall 35. During the closing movement the rear end of the rack bar is guided in and supported by a pipe 43 alined with the rack bar 18 and supported at its forward end by a lateral supporting lug 44. At its rear end, the pipe may be suspended from the ceiling 17 by a strap 45.

Mounted on the front face of a lateral extension 46 of the bracket plate 36 (see Fig. 11) is an electric motor 47 by means of which the operator is driven. In the preferred embodiment, this motor, through the medium of an operative connection including a flexible coupling 48 (Fig. 2), a centrifugal clutch 49 and a gearing for multiplying the torque and reducing the speed of the motor, drives a pinion 50 meshing with the teeth along the upper edge of the rack bar 18.

Herein the coupling 48 comprises a disk 51 (Fig. 5) keyed to the motor shaft and having a radial slot 52 therein receiving a pin 53 which is mounted on a disk 54 and which extends parallel to the motor shaft. The disk 54 is formed with a sleeve 55 (Fig. 10) which is rotatable on the outer end of a shaft 56 and held thereon by a screw 57. The shaft 56 is journaled in a bushing (see Fig. 10) in a bearing 57.

The centrifugal clutch 49 preferably comprises a driving member in the form of two clutch dogs 58 (Figs. 6 and 10) pivoted on the disk 54 and disposed within a drum 59 which is fixed to the shaft 56 and which constitutes the driven member of the clutch. The dogs 58 have lugs 60 which engage frictionally with the internal surface of the drum and thereby rotate the drum when the motor has attained sufficient speed for the centrifugal force acting on the dogs to overcome the tension of springs 61. By providing a centrifugal clutch drive, the application of the load to the motor is delayed until normal speed and torque have been attained. Therefore, it is possible to use a split phase induction motor which has a small starting torque but which is advantageous from the standpoint of cost and reliability of operation. By using the flexible connection 49, the necessity for precise alinement of the motor shaft and the shaft 56 is avoided.

In the present instance, the means for reducing the speed and multiplying the torque of the motor is a planetary gear mechanism (see Figs. 8 to 10) mounted in a central recess 30ª (Figs. 10 and 11) of the main frame member 30. This gearing includes a pinion 62 fixed to the inwardly projecting end of the shaft 56 and meshing with each of three spur gears 63 which are disposed within and in mesh with the internal teeth of an annular gear 64. As best shown in Figs. 8 and 10, the gears 63 are rotatably mounted on flying studs 65, which are carried by a disk 66 and spaced equal distances apart thereon. The disk 66 is pinned or otherwise fixed to the inner end of a shaft 67 alined with the shaft 56 and journaled in a bushing in a bearing 68. At its outer end, the shaft 67 carries the pinion 50 for driving the rack bar 18, the rear supporting roller 42 being located directly beneath this pinion and serving to hold the rack bar firmly in mesh with the pinion. The gear 64 is retained on its floating mounting by an annular flange 69 (see Fig. 10) formed on the disk 66 and a flange segment 70 formed on the adjacent reinforcing rib 40.

It is to be observed that the planetary gearing just described operates differentially, that is to say, it has one driving member, the pinion 62, and two driven members, the disk 66 and the annular gear 64, both of which tend to rotate when the pinion 62 is rotated in either direction but either of which may be held stationary while the other rotates. In normal operation the annular gear 64 is held against rotation by means to be presently described. Under these conditions, rotation of the pinion 62 causes the gears 63 to rotate about their own axes while at the same time revolving within the annular gear about the axis thereof. This revolving motion of the gears causes the disk 66 on which they are mounted and the pinion 50 to rotate at a speed proportional to the speed of the pinion shaft and to the ratio between the number of teeth on the pinion 62 and the annular gear. By properly constructing the pinion and the annular gear, any desired speed reduction can be effected for driving the device to be operated, in this instance the doors 15.

*Overload release*

Advantage is taken of the properties of this differential gearing in constructing an efficient overload release device whose function it is to render the motor ineffectual as a means for driving the doors, thereby preventing damage to objects and injury to persons struck by the doors in moving in either direction. A device for accomplishing these functions in a reliable and efficient manner should act quickly to completely free the door from the driving mechanism when an obstruction is encountered and should operate when a predetermined opposing force is encountered whether applied suddenly or gradually.

To construct an overload release device having the above properties, means is provided which, while operating normally to hold the annular gear member 64 of the planetary differential against rotation, is adapted to yield and then quickly and completely free the gear for rotation whenever a predetermined critical force is exerted in opposition to the operation of the other driven member of the differential by the motor. The means for thus rendering the motor drive ineffectual for operating the disk 66 and therefore the doors comprises a holding element (see Fig. 4) in the form of a pivotal detent member or dog 71 which, in the present instance, is mounted on a bell crank lever 72 and yieldably pressed in a radial direction into holding engagement with the gear 64 by a spring 73. To provide a holding element that operates practically independently of friction, the dog 71 is constructed with two spaced teeth 74 (see Fig. 9) located equidistant from the longitudinal center line of the dog and the line of action of the force tending to hold the dog against the gear. The teeth 74 are adapted to enter notches between closely spaced teeth 75 which are formed around the entire outer peripheral surface of the gear 64 and thereby enabling the gear to be held against rotation in a relatively large number of different angular positions. The teeth 75 extend parallel to the gear axis and have intersecting side surfaces which the edges of the teeth 74 are adapted to engage.

The bell crank 72 has two arms 76 and 77 projecting forwardly and rearwardly respectively from a bearing portion which is pivoted on a pin 78 between two standards 79 formed on the top plate 31. On the arm 77 a short distance behind the axis of the bell crank there is a laterally projecting pin 80 (Fig. 10) on which the overload release dog 71 is pivotally mounted intermediate its ends. The dog is thus arranged to swing in the plane of the annular gear 64 and is also adapted for movement in a radial direction toward and away from the gear by oscillation of the bell crank 72. The spring 73 acts between a stud 81 on the arm 76 and an adjusting bolt 82 anchored in the bracket plate 36 of the frame casting and tends to swing the arm 77 of the bell crank downwardly, thereby yieldably pressing the teeth of the dog against the gear 64. Such movement of the dog is limited by a stop 83 (see Fig. 4) positioned beneath a side arm 84 formed at the rear end of the bell crank arm 77.

By reason of the spacing of the two teeth on the overload release dog 71, it will be observed that when the dog is positioned as shown by the full lines in Fig. 9, a resisting torque will be produced by the spring, which acts in opposition to the rotation of the gear 64 in either direction. That is to say, the torque will be applied to the gear by one of the teeth 74 depending upon the direction in which the gear 64 tends to rotate as determined by the rotation of the motor. But when the torque exerted on the dog by the gear 64 is sufficient to overcome the torque caused by the spring 73, the dog will be swung "over center", that is, the holding tooth on the dog will be moved toward and beyond a radial line extending through the pivotal axis of the dog. To permit such movement of the dog, the bell crank arm 77 must be swung upwardly against the action of the spring 73. After the dog has thus been released, the spring 73 will swing the bell crank 72 to move the dog downwardly into the position shown in dotted outline in Fig. 9, the stop 83 serving to hold the adjacent side face of the dog out of engagement with the teeth of the gear 64. Thus, it will be seen that as soon as the dog passes its "over center" position in either direction, the gear 64 will be free to rotate, and the other driven member of the differential, that is, the disk 66, will remain stationary.

The torque tending to rotate the annular gear element of the differential will, it will be observed, be proportional to the load on the other driven member, in other words, to the force required to move the doors. That is to say, in any differential gearing, the distribution of the power to the two driven members thereof is proportional to the loads on them. Therefore, if the tension in the spring 73 is adjusted by means of the bolt 82 so that the torque produced thereby and acting to hold the gear 64 against rotation will be greater than the torque exerted by the motor on the gear 64 in the normal opening and closing operation of the doors, the gear 64 will be held stationary and the power of the motor will be utilized in operating the doors. In practice it is preferable to adjust the spring so that the critical torque to which the overload release dog will respond will be somewhat greater than that required to hold the gear, thereby allowing a slight margin for swelling of the doors and other similar conditions producing resisting forces which can readily be overcome.

To illustrate the operation of the overload release device when the spring 73 is properly adjusted to respond to excessive opposing loads, let it be assumed that the motor is operating to close the doors and that an obstruction such as a person standing in the path of one of the doors is encountered. Under these conditions, the excessive load placed upon the main driven member of the differential would cause an abnormal torque on the gear 64 thereby rotating the gear in a direction indicated by the arrow in Fig. 8. Such movement of the gear would move the overload release dog through the position shown in Fig. 8 and into "over center" position as shown in dotted outline in Fig. 9. Thereafter none of the power of the rotating motor will be applied to the doors because the annular gear is free to rotate. For this reason there is no danger of the person being injured, in fact the doors can be moved to any desired position while the motor continues to rotate. The means for resetting the overload release dog after it has been thus released will be described later in connection with the overload release lock which serves to prevent manual operation of the doors.

It should be noted that the torque which must be exerted by the reacting force on the doors in order to release the overload release dog decreases as soon as the dog starts to swing from its set position. This is accomplished in the present instance by constructing the arm 76 of the bell crank so that the line of action of the force exerted by the spring 73 will be positioned relatively close to the pivotal axis of the bell crank and will move toward said axis as the dog starts to move to releasing position, that is, when the bell crank arm 76 swings downwardly. Owing to this decrease in the length of the moment arm of the force applied by the spring 73, the torque tending to hold the gear 64 against rotation will decrease progressively as soon as an opposing torque has been created which is sufficient to start the dog 71 from its normal set position. It is to be noted in this connection that the spring 73 is of substantial length while the range of movement of the dog 71 is small so that the spring acts to restrain the releasing movement of the dog with a substantially uniform force throughout such range of movement. Because of this provision, the overload release will respond equally well to sudden and gradually applied loads. A stop 85 is provided to limit the upward swing of the bell crank arm 77 so that the spring cannot move "over center", that is, below the pivotal center of the bell crank 72.

Another feature of the overload release is that it is not effected materially by friction between the parts. In the present arrangement a relatively large torque is exerted by the gear 64 when the motor is operating the doors; consequently a strong spring 73 is required to hold the gear against rotation. Friction between the bell crank and its pivot and between the dog 71 and the gear 64 therefore constitutes such a small part of the total force holding the gear 64 that the effect of variations in the frictional force will be negligible. Thus, the overload release will always respond to a predetermined minimum force exerted by the obstruction encountered.

It will be noted that by the provision of a frictional type centrifugal clutch, the power of the motor in overcoming the inertia of the doors will be applied gradually thereby preventing the overload release dog from being thrown over center at the beginning of the operating cycle.

Motor control devices

The starting and stopping of the motor either in opening or in closing the doors in each operating cycle is controlled by a brake 86, a main motor switch 87, and the direction of rotation of the motor is determined by the position of a reversing switch 88 associated with the motor field circuits. In the preferred embodiment, the brake and the motor switch are actuated substantially simultaneously and are arranged so that the brake will always be applied when the motor switch is open, and vice versa. To this end, a single control element in the form of a lever 89 is employed for effecting all of the necessary control movements of the motor switch and the brake, as well as numerous other functions that will appear later. In the normal cycle of operation, the lever 89 is tripped from one set position and in moving from this position operates to release the brake and to close the motor switch, thereby starting the motor in a direction determined by the position of the reversing switch. Near the end of the operating cycle, the lever is moved automatically into a second set position thereby being conditioned for movement from said second position into said first set position. Finally, the lever is tripped from the second set position and, in moving to its first set position, opens the motor switch and applies the brake to stop the motor and terminate the cycle. These various functions are accomplished by providing a floating mounting for the control lever, that is to say, the lever is mounted so that its fulcrum may be changed to effect the movements just described in proper sequence.

Figure 3:
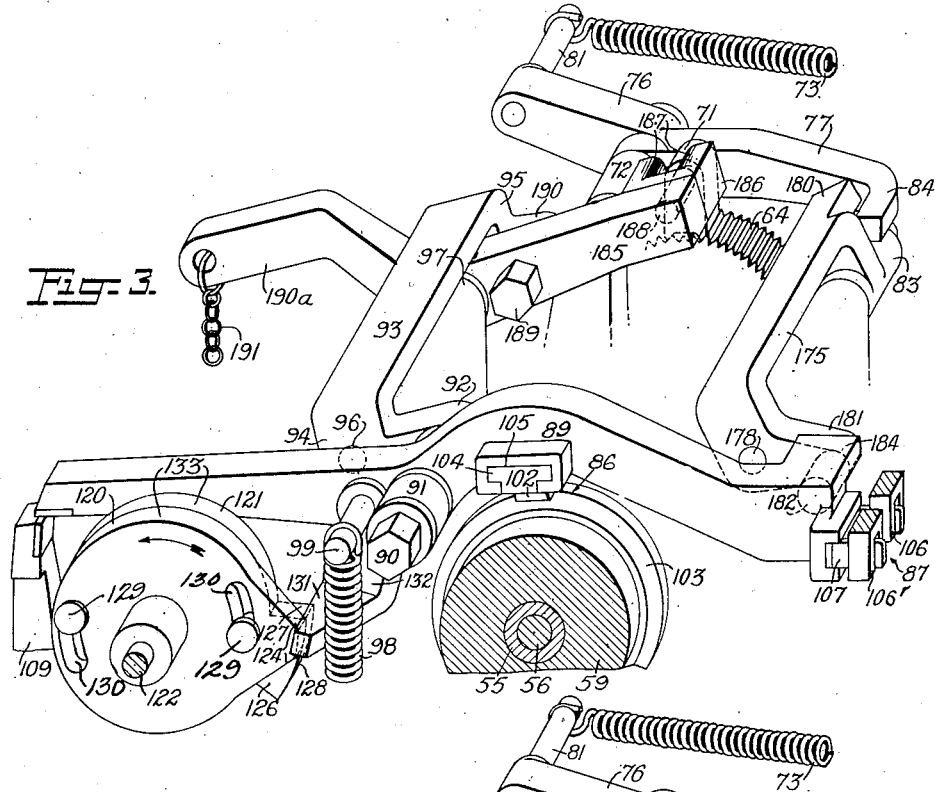
Figs. 3 and 4 are perspective views of the mechanism for controlling the motor and the application of the power thereof.
Figure 4:
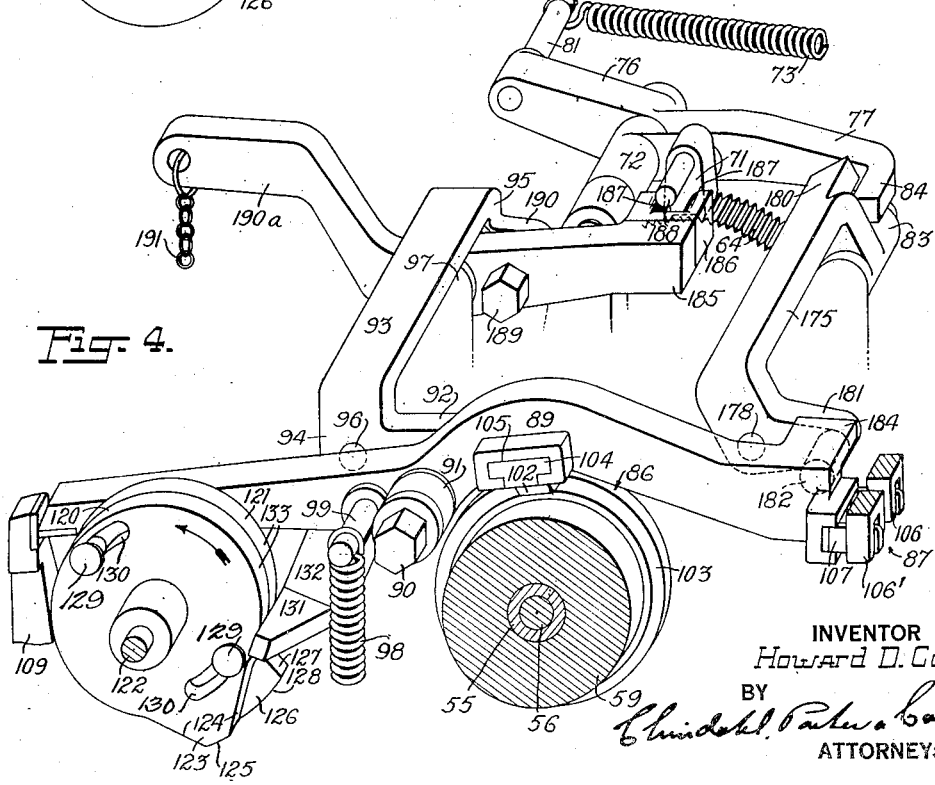

As is best shown in Figs. 2, 3 and 4, the lever 89 is shown as comprising a bar having a curved portion extending over the clutch drum 59. The lever is mounted to swing in a vertical plane, and to this end is pivoted between its ends upon a shoulder stud 90 extending through an enlarged portion 91 and threading into the rear end of an arm 92 integrally formed on and projecting rearwardly from a yoke member 93. The headed outer end of the stud 90 serves to hold the lever in place. The yoke member 93 has depending legs 94 and 95 at its ends which are pivoted on a supporting pin 96. This pin extends parallel to the stud 90 and is mounted in a lug 97 upstanding from the top plate of the frame casting. Thus the lever 89 is mounted eccentrically of the axis of the yoke member. A tension spring 98 acting on the lever 89 at a point between the axis 96 of the yoke member 93 and the axis defined by the stud 90, normally tends to swing the rear end of the lever upwardly about the stud 90 as a pivotal center and the arm 92 of the yoke member downwardly about the pin 96. At its upper end, the spring 98 is attached to a pin 99 on the lever 89 and at its lower end to an adjusting bolt 100 held by a lug 101 (see Fig. 5).

The brake illustrated herein comprises a block 102 of friction material mounted on the lever 89 in position to work in a peripheral groove 103 (see Fig. 10) in the drum 59. To utilize the force of the spring 98 efficiently for stopping the doors, the groove 103 is formed with inclined sides which cooperate with the bevelled edges of the block 102 to increase the normal pressure between the brake surfaces. The block 102 is formed with a T-shaped portion 104 which fits removably in a slot 105 in the lever 89 and therefore alines itself automatically with the groove 103. As will appear later, engagement between the drum 59 and the block 102 serves to limit the downward swing of the control lever 89. The full force of the spring 98 is therefore utilized in pressing the block 102 into the groove 103.

Herein the main motor switch 87 is located at the rear end of the lever 89 which projects through an opening 105 in the wall 36 of the frame member. This switch comprises a pair of electrically connected blades which make contact between two pairs of insulated contact terminals 106 and 106' when the rear end of the lever 89 is swung upwardly. The blades constitute the legs of a U-shaped member 107 which is rigidly mounted in a transverse slot in the rear end of the lever 89. The terminals are secured to an insulating block 108 mounted on the underside of the horizontal ledge 37.

Tripping means is provided for holding the lever 89 in a set position whenever the motor is idle so that it may be released under manual control to initiate operation of the motor. This means comprises a latch 109 adapted to swing into the path of the forward end of the lever 89 and thereby hold this end of the lever in raised position against the action of the spring 98 which tends to hold the lever against the brake drum 59 about the end of the latch as a pivotal center. This relation is shown in Fig. 6. The latch 109 is disposed in the plane of the lever 89 and is pivoted intermediate its ends on a pin 110 mounted in a lug 111 on the bracket member 39. (See Fig. 11.)

As a means for tripping the control lever to initiate a cycle of operation, an electromagnetic coil 112 is arranged when energized to act on the lower end of the latch lever 109 as an armature. This coil is supported by its core member 113 which is secured in a slot 114 on the under side of a lateral extension 115 (see Fig. 11) formed on the side flange 34. A compression spring 116 serves to press the upper end of the latch against the end of the lever or into latching position beneath the lever, the latter movement being limited by a stop 117 positioned to engage an arm 118 on the latch (see Figs. 6 and 11).

It will be apparent that when the latch is withdrawn by an energization of the coil 112, the control lever will swing about the stud 90 under the action of the spring 98 from the position shown in Fig. 6 to the position shown in Fig. 4. In thus pivoting about the stud 90, which at that time will be held fixed by means which will appear later, the brake will be released and the motor switch will be closed simultaneously. This will start the motor in operation and the doors will be moved either to open or to closed position.

The electromagnetic coil 112 may be energized to initiate an operating cycle from any appropriate control means, such, for example, as by a hand switch 119 (see Fig. 1) located within the building and connected in series with the coil 112 and a source of current. Or a switch for energizing the coil 112 may be controlled from a remote point as by means of a radio receiving device such as is disclosed in my Patent No. 1,760,378.

Near the end of each operating cycle the lever 89 is actuated automatically against the action of the spring 98 to reset the latch 109 for the succeeding cycle of operation and simultaneously to condition or reset the lever so that it may be subsequently released in the same cycle by another tripping means to open the switch and apply the brake with a snap action. In other words, the lever is operated so as not only to terminate the instant cycle automatically but to leave the control lever conditioned for proper operation in the succeeding cycle. The means for thus conditioning the lever 89 is, in the preferred embodiment, in the form of a cam device comprising two disks 120 and 121 carried by a cam shaft 122 which extends parallel to the axis of the yoke member 93, the shaft being journaled in lugs 123 formed on the top plate 31. The disk 120 is fixed to the cam shaft 122 at a point beyond the lever 89 and is formed with a cam lobe 123 having inclined surfaces 124 at the ends of a circumferential surface 125. The disk 121 is loosely mounted on the shaft 122 adjacent the disk 120 and is formed with a cam lobe 126 considerably longer than the lobe 123. The lobe 126 has abrupt or radially extending surfaces 127 at the ends of a circumferential surface 128 which has substantially the same radius of curvature as the surface 125. On the disk 121 are pins 129 which project through slots 130 in the disk 120 so as to allow for limited rotational movement of the lobe 126 relative to the lobe 123.

In the angular movement of the shaft 122 in either direction, the two lobes act as a single cam which works against a follower comprising an extension 131 projecting laterally from an arm 132, the latter being integrally formed on the leg 94 of the yoke member 93. Normally the follower is positioned so as to clear the dwell surfaces 133 of the cam disks when, as shown in Fig. 6, the brake drum 59 is acting as a stop for the control lever and thereby limiting the swing of the yoke member 93 by the spring 98. Thus, the full effect of the spring 98 is used for braking. However, when the latch 109 is withdrawn as above described, the follower moves into engagement with the dwell surfaces 133 of the cam disks to limit the downward swing of the stud 90. The latter now provides a fixed pivot on which, during the initial control movement, the control lever 89 turns by the action of the spring 98 to lift the brake member and close the motor switch.

The cam device actuates the yoke member 93 as follows when the cam shaft 122 is oscillated in either direction near the end of the door operating cycle: In the rotation of the cam shaft the follower arm 131 first strikes the leading abrupt surface 127 as shown in Fig. 4, thereby holding the disk 121 back until the pins 129 reach the remote ends of the slots 130. Thus the surfaces 127 are shifted relative to the surfaces 124. During this shifting movement the leading inclined surface 124 of the lobe 123 engages the follower arm 131 and moves it rearwardly thereby oscillating the yoke member 93 to swing its arm 92 upwardly. The follower arm 131 then rides along the arcuate surface 128 which holds the yoke member in its actuated position until the abrupt trailing surface 127 is carried beyond the follower arm. When this occurs the arm 92 snaps downwardly under the action of the spring 98.

The movements of the control lever 89 resulting from such actuation of the yoke member 93 will now be described, it being assumed that the parts are in the position shown in Fig. 4 with the motor switch in closed position, the brake released, the spring 98 tending to swing the lever about a fulcrum formed on the ends of the motor switch blades or other means adjacent the blades, and the cam dwell portions 133 serving to limit the downward movement of the lever by the spring. Now, when the arm 92 of the yoke member is raised by the action of the inclined leading surface of the cam device, the stud 90 is carried upwardly and in its movement swings the control lever 89 upwardly against the action of the spring 98 and about the switch blades as a fulcrum thereby extending the spring 98. In this single operation the lever 89 will be positioned so that it may be released by either of its two tripping members which are the latch 109 and the trailing portion of the cam device. Thus as the lever swings upwardly, the forward end cams the latch 109 outwardly, and the latch finally moves in under the end of the lever to hold that end in raised position. At this time the lever will be held in a second set position by the circumferential portion 128 of the cam lobe. Then, when the abrupt trailing surface 127 of the cam device passes the follower arm 131, the lever will be tripped from its second set position since the supporting stud will thereby be permitted to move downwardly under the action of the spring 98. In this downward movement, the control lever pivots about the end of the latch 109 and thereby opens the switch 87 and applies the brake with a quick snap action. Thus, the cycle of operation will be terminated leaving the lever latched up so that it can be tripped under manual control at the beginning of the next cycle.

It will be observed that in a complete cycle of operation, the control lever 89 will fulcrum about three different points; first, when released by withdrawal of its first tripping member, the latch 109, the lever fulcrums intermediate its ends about the stud 90; second, in the resetting movement the fulcrum is located at the switch blades on the rear end of the lever; and third, when released by withdrawal of its second tripping member, the cam lobe 126, the lever swings about its forward end as a pivot center. By shifting the pivotal center to the rear end of the lever during the resetting operation, movement of the lever is permitted without disturbing the motor switch, which must remain closed until the end of the cycle. By pivoting the lever about the latch 109 during the stopping operation, the setting of the latch is not disturbed during the opening of the switch and everything is left in proper condition for the next operating cycle.

Where the movement of the driven part from which the cam device is actuated is sufficiently rapid, the loose disk 121 may be omitted. In such a case, opening of the switch 87 would be controlled by the inclined trailing surface of the cam lobe 123.

Means is provided for oscillating the cam shaft 122 near the end of each operating cycle to operate the cam device. In the present instance, the movement of the rack bar 18 is utilized for this purpose through the medium of a lost motion connection with the cam shaft 122. To provide such a connection, a crank arm in the form of a segment 135 (Fig. 7) is fixed to the cam shaft above the rack bar 18 and is provided with spaced lugs 136 and 137. A lever 138 is loosely mounted intermediate its ends on the cam shaft 122 with its short upper end positioned between the lugs 136 and 137. The lower weighted end of the lever projects into the path of two cam blocks 140 and 141 (see Figs. 6 and 7) secured against the outer side of the rack bar 18 near the opposite ends thereof. In the open position of the doors, the cam shaft 122 will be positioned as shown in Fig. 7 with the lever 138 raised by the cam block 140. When the rack bar moves rearwardly on the closing cycle of the doors, the block 140 will pass from under the lever 138 and the latter will fall downwardly, as shown in dotted outline in Fig. 7, such movement being permitted by the lost motion provided between the lugs 136 and 137 and the lever 138. Then, as the doors approach their closed position, the cam block 141 will strike the lever 138 and will swing its upper end to move the lug 136. This oscillates the cam shaft 122 through about 90°, leaving the lever 138 positioned as shown in dotted outline in Fig. 6. During such oscillation the control lever is actuated as above described. The lever 138 is operated in the reverse manner, during the opening cycle of operation of the driving unit. It will be apparent that the stopping of the motor and therefore the length of operating cycle of the operator is determined by the position of the cam blocks 140 and 141 on the rack bar 18. Thus, the length of the cycles may be varied to suit any given operating conditions by properly positioning the cam blocks.

It will be observed that the blocks 140, 141 move in a rectilinear path and that the end of the arm 138 rides up onto the flat upper surface of one block in actuating the shaft 122. In this way, the extent of movement of the shaft 122 is accurately determined independently of the exact longitudinal position in which the bar 18 is arrested which position may vary slightly in the different operating cycles. By reason of this lost motion connection with the shaft 122, the arm 138 is free to drop downwardly at the beginning of each cycle so that it may be used in the termination of said cycle even though the shaft 122 remains in set position until after the arm has been engaged by the other cam block.

The reversing switch 88 (Figs. 2 and 5) is arranged to be actuated in the present instance by the cam shaft 122 and the effect of such actuation is to condition the motor circuit connections so that the motor will, when started in operation rotate in a reverse direction to that of the preceding cycle. This is accomplished by reversing the connections for the starting field 142 (see Fig. 13) of the motor relative to the main motor field 143 while the starting field is not in use. The switch 88 shown herein, is of well known construction and its movable element is located on the end of the cam shaft 122 beyond the cam disk 120. In the form illustrated the movable element of the switch includes two connecting plates 144 and 145 (Fig. 2) the former having two contact arms 146 and the latter having arms 147 which are adapted to engage between spring contacts 149, 150, 151 and 152. The plates 144 and 145 are clamped between insulating disks 153 on the shaft 122 and are insulated from one another by a plate 154 and from the shaft 122 by a bushing 155. (Fig. 5.) A bolt 156 threading on the end of the cam shaft serves to clamp the disks 153 against a sleevelike extension 157 on the cam disk 120. The spring contacts 149, 150, 151 and 152 (see Fig. 2) project radially inward from their supporting members 158 (see Fig. 2) in position to receive the contact arms of the plates 144 and 145 between them when the cam shaft is oscillated in either direction. The supporting members 158 are L-shaped in form and are secured against the outer face of an insulating block 159. The latter is bolted in vertical position onto a flange 160 (see Fig. 11) formed on the frame extension 115 and is recessed to receive the cam shaft 122. When the doors are open, the cam shaft 122 will be positioned as shown in Fig. 5 with the plate 144 connecting contacts 149 and 150 and the plate 145 connecting contacts 151 and 152. Now, if the cam shaft is oscillated back to door-closing position, the plate 144 will move to make contact between contacts 149 and 152 while the plate 145 will connect contacts 150 and 151.

If desired another connecting plate 161 may be provided on the cam shaft 122 and arranged to connect contacts 163 and 164 in one position of the doors and contacts 165 and 166 in the other position. This switch may be used for any desired purpose, as, for example, to control the lights in the building, as disclosed in Patent No. 1,783,633.

*Motor control circuits*

The motor control circuits will now be explained and traced in relation to the operation of the driving unit during one operating cycle. Referring to the wiring diagram shown in Fig. 13, the grounded power line 168 of a source of alternating current is connected to movable member 107 of the main motor switch while the other power line 169 is connected to one terminal 106 of the motor switch through the main field 143 of the motor. The power line 169 is also connected through a conductor 170 to the contact 149 of the reversing switch. The reversing switch contact 151 is connected by a conductor 170ª to the terminal 106' of the motor switch. A shunt circuit 171 extends from the conductor 170ª to the grounded line 168 through the tripping magnet coil 112 and the manual control switch 119. Conductors 172 and 173 connect opposite ends of the starting field 142 of the motor to the reversing switch contacts 150 and 152. The motor is provided with the usual centrifugal switch 174 in series with the field 142. This switch is closed when the motor is at rest and is held open by centrifugal action when the rotor of the motor is rotating so that after the motor has attained a predetermined speed the starting field will be cut out automatically. This arrangement for preventing energization of the magnet except when the motor is at rest or substantially so, forms the subject matter of a copending application by Duncan J. Stewart Serial No. 181,661, filed April 17, 1927.

The operation

The operation of the motor control mechanism is as follows, assuming the parts to be positioned to correspond to the open position of the doors as shown in Figs. 2, 5 and 7. Under these conditions, the contacts 149 and 152 of the reversing switch are connected with contacts 150 and 151 respectively by the connecting plates 144 and 145. When the control switch 119 is closed, the magnet coil 112 will be energized through the circuit leading from the line 168 through the shunt circuit 171, contacts 151 and 152, conductor 173, field 142, switch 174 which is then closed, conductor 172, contacts 150 and 149, conductor 170 to the power line 169. Such energization of the magnet trips the latch 109 which permits the lever 89 to pivot about the stud 90 thereby releasing the brake and closing the motor switch 87. Closure of the motor switch completes a circuit through the main field 143 and also completes a circuit through the starting field 142 as follows; from the power line 168, switch member 107, terminal 106' of the motor switch, conductor 170ª, contacts 151 and 152 of the reversing switch, conductor 173, field 142, switch 174 which is still closed, conductor 172, contacts 150 and 149, conductor 170 to the power line 169. Thus, the motor is started in a direction to close the doors. When normal speed and torque have been attained, the switch 174 is thrown open by centrifugal action. Thereafter, the field 143 is maintained energized until the circuit is broken by the opening of switch 87. As the doors approach their closed positions (see Figs. 3 and 4) the cam shaft 122 will be oscillated by the cam block 141 and the members 146 and 147 of the reversing switch will be moved to connect contacts 149 and 152 and contacts 150 and 151, respectively. Such reversal of the starting field connections will not change the direction of the rotation of the induction motor because, in the present instance, energization of the starting field while the motor is running is prevented by the centrifugal switch 174 which is always open when the motor is running. Simultaneously with the operation of the reversing switch the cam device operates to swing the lever 89 about the motor switch 87 thereby resetting the lever for the next cycle of operation. When the cam follower arm 131 is released by the cam disk 121 and the lever 89 pivots about the latch 109 as a fulcrum, the motor switch is opened and the brake is applied. Thus, the motor stops because there is no current flowing in either of its fields.

In the opening cycle of operation the above mentioned functions are repeated except that the current flow through the starting field 174 is reversed owing to the position of the reversing switch connecting plates which causes the motor to rotate in the opposite direction. In all other respects, the cycle is identical to the closing cycle just described.

It is to be noted that inasmuch as the tripping magnet 112 is in series with the centrifugal switch 174, the former cannot be energized except when the motor is at rest or substantially so. Therefore, the motor must slow down sufficiently to close the switch 174 before the lever 89 can be tripped again to close the motor switch. This safeguard effectually prevents continued operation of the motor which might otherwise take place if it were possible to energize the magnet 112 by holding the control switch 119 closed or by closing it after the control lever 89 has been reset, thereby preventing engagement between the latch 109 and the control lever 89.

It will be observed that the control switch 119 need be closed only momentarily to initiate a cycle of the operator and that the switch is called upon to carry only that current which is required to energize the magnet 112. This desirable arrangement is made possible by providing a releasable device such as the lever 89 for actuating the main motor switch and utilizing the magnet 112 to cause release of the device.

Locking means

When the doors are closed, it is usually desirable to have them locked against movement by hand in order to prevent strangers from entering the garage or other building in which the power operator is used. In the present instance, the doors are locked in both of their limiting positions by means which is moved to unlocking position in the movement of the releasable lever 89 to close the switch 87 and to locking position as the switch is opened. As herein disclosed, this means acts to prevent operation of the overload release device so that the brake, through the reduction gearing, will serve to hold the doors against movement by hand. That is to say, when the overload release is locked and the brake is applied, a force sufficient to rotate the brake drum cannot be applied at the doors owing to the relatively large increase in leverage between the doors and the drum. To provide a lock for the overload release, a locking member 175 (Fig. 4) is provided for holding the bell crank 77 against upward releasing movement whenever the motor switch is open. The locking member illustrated herein is U- shaped in form and has two depending legs which are pivotally supported at the opposite ends of a pin 178 mounted in a lug 179 on the frame casting. A lug 180 formed as an extension of the locking member 175 projects into the path of and is positioned above the lateral extension 84 at the rear end of the bell crank arm 77 when the locking member is swung rearwardly as shown in Fig. 2. In this position of the locking member, the lug 180 holds the bell crank arm 77 down against movement in the direction to permit the overload release dog to move "over center". If the locking member is swung forwardly as shown in Figs. 3 and 4, the bell crank 77 will be free to swing upwardly thereby permitting operation of the overload release device if the occasion should arise.

In order that the overload release device shall be operative whenever the doors are operated by the driving unit as distinguished from hand operation, the locking member 175 is arranged to be actuated by the same means as the motor switch element 107 that is, by the control lever 89. To this end, an arm 181 is formed on the adjacent leg of the locking member which arm projects rearwardly through the opening 105. This arm carries a pin 182 which is guided in a slot 183 defined by two lugs 184 on the rear end of the lever 89. The arrangement is such that when the lever 89 is tripped and its rear end is swung upwardly to close the motor switch, the locking member 175 will be swung forwardly to free the overload release bell crank 72. Thus the overload release is unlocked before the power of the motor is applied to the doors, and no damage can be done to the motor in case the doors are obstructed in their closed or open positions. Such a condition might arise, for example, when the doors are blocked from the outside by snow or ice. On the other hand, the lock is effective to hold the doors against opening by hand until a cycle of operation is initiated.

At the end of the operating cycle when the motor switch is opened by oscillation of the lever 89 downwardly, the locking member 175 will be swung rearwardly into locking position (see Fig. 7). In this position the locking member holds the overload release dog against releasing movement while the doors are being stopped by the brake.

*Overload release reset means*

Means is provided for resetting the overload release dog 71 after it has been tripped by an obstructing load, and this resetting may be effected either by manual operation while the doors are partially open or by automatic operation as the door operating cycle is completed by manually moving the doors to either closed or open position. The means for performing this function comprises (Figs. 3 and 4) a lever 185 arranged, when actuated, to swing the overload-release dog 71 from its released position shown in dotted outline in Fig. 9 upwardly into holding engagement with the gear 64 and shown by the full lines in Fig. 9. The lever 185 extends parallel to the floating control lever 89 and is pivotally supported intermediate its ends on the pin 96 between the lug 97 and the leg 95 of the yoke member 93. At its rear end, the lever 185 carries a cam block 186 (Figs. 4 and 12) having cam surfaces 187 which define a vertical and laterally opening slot beneath a pin 188 rigid with the overload-release dog 71. The pin 188 is located relatively close to the pivotal axis of the dog 71 so that it will be engaged by the upper surface of the cam block 186 when the dog is in its over center position in either direction. The upper ends of the cam surfaces 187 are curved so that the pin 188 will be guided into the cam slot when the cam block is raised. When the lever 185 is raised, the center of its cam slot will move in an arcuate path as indicated by the dot-dash line in Fig. 12 and the pin 188 will be cammed upwardly into centered position, the teeth of the dog engaging with teeth on the gear 64. In the event that the gear 64 is running when resetting of the dog 71 is attempted, the cam block 186 will serve to hold the dog in set position until the gear has been stopped. The overload release device will again be releasable as soon as the lever 185 has been lowered.

To provide an automatic means for resetting the overload release dog when the doors approach either of their limiting positions, the lever 185 is pivotally connected by a stud 189 (Figs. 4 and 7) to a rearwardly projecting arm 190 formed on the adjacent leg 95 of the yoke member 93. When the yoke member is swung upwardly by the cam disk 120 for the purpose of resetting the motor control lever 89, it also acts to raise the rear end of the lever 185 so as to reset the dog 71 in case the latter has been swung over center. Since the lever 185 is connected to the yoke member 93, the spring 98, which tends to swing the yoke member rearwardly, will also act to hold the resetting lever 185 downwardly so that the cam block 186 on the lever cannot interfere with the operation of the overload release dog. Furthermore, it is to be noted that the parts are so proportioned and arranged that the movement of the control lever 89 in applying the brake member to the drum is not restricted by the overload release lever.

*Auxiliary functions and mechanisms*

Manually operable means is provided for resetting the overload release when the doors are partially open and for stopping the operator at any desired point in either operating cycle. This means comprises an extension 190ª (Fig. 4) of the lever 185 which projects forwardly from the frame casting and is arranged to be actuated by a hand chain 191. When the lever 185 is actuated by pulling on the chain 191, the cam block 186 will be raised in an attempt to set the overload release dog.

Such movement of the lever 185 swings the yoke member 93 forwardly in the same manner as the cam disk 120 would do, thereby swinging the floating control lever 89 about its rear end as a fulcrum, so that the latch 109 will become effective to hold the forward end of said control lever in set position. Then when the chain 191 is released, the spring 98 will operate the lever 89 to open the motor switch 87. In other words, the movements of the control lever 89 which are ordinarily effected automatically by the cams 140 and 141 on the rack bar 18 through the medium of the cam shaft 122 and the cam disks 120 and 121 to reset the lever 89 and to stop the motor at the end of an operating cycle may be effected at any point in either operating cycle by merely pulling and then releasing the chain 191. Thereafter by closing the manually controlled switch 119, the normal operating cycle may be completed in the usual way. Inasmuch as the cam shaft 122 is not oscillated when the chain 191 is pulled, the reversing switch 88 will not be actuated when the doors are stopped in partially open position.

It will be seen that whenever the resetting block 186 is raised whether by hand or automatically, the dog 71 will be reset if the dog is in released position but if the dog is not released, its setting will not be disturbed.

It sometimes happens that the electric power supply is temporarily discontinued. When this occurs and it is desired to open the doors, the overload release may be unlocked by tripping the latch 109 manually which moves the locking member 175 into position to free the overload release lever 77. Then the doors may be pushed or pulled open manually, the initial force thus exerted serving to trip the overload release dog 71. Thereafter, the doors can be moved easily since the planetary gears 63 and the annular gear 64 can roll as a unit around the pinion 62. When the doors are again closed, they may be locked by pulling on the chain 191. This latter operation resets the overload release device, locks the overload release and conditions the control lever 89 for the next operating cycle.

When the present driving unit is applied to outwardly swinging doors, means may be provided for assisting the motor in starting the doors to closed position. This means includes a spring buffer (see Fig. 15) mounted on the bracket 21 and arranged to absorb energy from the doors during the opening cycle and to supply the energy thus stored to close the doors during the closing cycle of operation. The buffer comprises a rod 193 slidably mounted in a bearing 194 and carrying a compression spring 195 acting between the bearing 194 and a head 196. As the doors approach their open position, the car 14 strikes the head 196 and moves the rod 193 forwardly against the action of the spring 195 until the doors are stopped by the brake. Then when the brake is released at the beginning of the closing cycle, the energy thus stored in the spring will be applied to the doors in a direction to close them. Rearward movement of the buffer rod is limited by a collar 197 positioned to strike the bearing 194. It will be observed that the buffer acts at a time when the moment arms of the forces applied to the doors are relatively short owing to the angular relation between the doors and the connecting rods when the doors are open.

It will be apparent from the foregoing description that the motor switch and brake, the reversing switch, the overload release, the lock therefor, the resetting means, and the centrifugal clutch are compactly arranged on a relatively small frame structure and so coordinated functionally with the power driving means as to form a machine of unitary character which can be used as a standard driving unit for various types of closures or other devices intended to be operated through predetermined cycles.

Owing to the presence of the centrifugally acting clutch between the motor and the shaft 56, the movement of the door may be arrested in an accurately defined position and with a minimum strain on the brake mechanism. This results from the fact that the clutch automatically disconnects the motor shaft from the brake drum 59 upon the initial application of the brake. Thus the brake is not required to overcome the kinetic energy of the motor's rotor which kinetic energy greatly exceeds that of the doors and the other driven parts because the rotor operates at the same speed as the brake drum whereas the momentum of the door is overcome by the brake through the medium of the speed reducing gearing.

The overload release per se and the mechanism per se by which the motor is controlled in the forms herein disclosed constitute respectively the subject matter of my co-pending divisional applications Serial No. 281,830, filed May 31, 1928 and Serial No. 283,802, filed June 8, 1928.

I claim as my invention:

1. A door operator having, in combination with two doors, a horizontal rack bar disposed centrally of and perpendicular to said doorway, means connecting said bar and the free edges of each of said doors, a stationary frame member slidably supporting the rear end of said bar when the doors are in open position, power driving means mounted on said frame member and adapted to reciprocate said rack bar, and a member projecting rearwardly from said frame member and providing a supporting surface upon which the rear end of said rack bar slides when the bar is projected rearwardly from said frame member by movement of the doors into closed position.

2. The combination with a closure member to be operated, of a motor, mechanism for transmitting the power of said motor to said member, an overload release device associated with said mechanism and including a dog normally held in set position and adapted when moved into releasing position to prevent transmission of motor power to said closure member, resetting means for said overload release device, and means for automatically operating said resetting means as said member approaches its limit of movement in one direction.

3. A power driving unit for a closure member having, in combination, a driving shaft, a motor adapted to drive said shaft, a driven shaft connected to said closure member, means providing a yieldable connection between said shafts responsive to a condition of overload, locking means adapted to prevent yielding of said connection, a brake adapted when applied to hold said driving shaft against movement, and means operated from said driven shaft for operating said locking means and applying said brake.

4. A power operator having, in combination with a closure member to be opened and closed, a rotatable element, motor actuated driving means therefor, means providing a yieldable connection between said element and said closure member responsive to a condition of overload, and locking means for said closure member comprising means acting positively to prevent yielding of said connection, and a brake operable to hold said element against movement by hand power applied to said closure member.

5. A power operator having, in combination with a closure member to be operated, a motor, means providing connection between said motor and said closure member including torque multiplying means, a brake located between said motor and said multiplying means and operable to prevent operation of said multiplying means by power applied to said closure member, means forming part of said connection and located between said brake and said closure member for disconnecting said motor and said closure member when an obstruction is encountered by the latter, and means for preventing operation of said last mentioned means when the brake is in operative position.

6. A power operator having, in combination with a closure member to be operated, a motor, connecting means adapted to operate said closure member upon operation of said motor, overload release means arranged to permit relative movement between said motor and said closure member when a condition of overload is encountered by the latter, and locking means for said closure member including means to prevent operation of said overload release means when said member is in a limit position.

7. A power operator having, in combination with a closure member to be operated, a motor, a driving connection between said motor and said closure member, a device forming part of said connection and operable when an excessive load is encountered by said closure member to yield and permit relative movement between the motor and the closure member, and means operable to render said device non-yieldable when said member is in its closed position.

8. A power operator having, in combination with a closure member to be operated, a motor, a driving connection between said motor and said closure member including overload release means responsive to a predetermined obstructing load encountered by said closure member to render said connection ineffectual and thereby free said closure member from said motor, locking means for the overload release means including an element movable between locking and unlocking positions and adapted when in locking position to prevent freeing of the closure member by said overload release means, motor control mechanism, and means operatively associated with said mechanism for moving said element into locking position at the end of an operating cycle of said closure member.

9. A power operator having, in combination with a closure member to be operated thereby, a motor, a releasable driving connection between the motor and said closure member, locking means for said closure member comprising a brake and means to prevent release of said connection, and a common actuating means for said brake and said last-mentioned means.

10. A power operator having, in combination with a closure member, a motor, a driving connection between the motor and the closure member, a releasable control device normally held in set position when the motor is idle and adapted when tripped to start said motor, and locking means for said closure member adapted to be moved into unlocking position automatically in the movement of said control device to start said motor.

11. A power operator having, in combination with a closure member to be operated thereby, a motor having a driving connection with said closure member for opening and closing the same in successive cycles of operation, a releasable element for initiating each cycle of operation, said element being normally held in set position and adapted to be tripped to start said motor, locking means for said closure member, and means actuated by said element when released to actuate said locking means before said motor is started.

12. A power operator having, in combination wth a closure member to be operated thereby, a motor having a driving connection with said closure member for opening and closing the same in successive cycles of operation, a motor control element adapted to be held in releasable position near the end of each of said cycles and adapted when tripped to stop said motor and thereby terminate the cycle, locking means for said closure member, and means actuated by said element when tripped from said position to actuate said locking means and lock said closure member.

13. A power operator having, in combination with a closure member to be operated thereby, a motor, means providing a driving connection between said motor and said closure member including a device responsive to a condition of overload to permit relative motion between said motor and said closure member, mechanism operable to prevent operation of said closure member by hand when at either limit of its movement including means for locking said overload device, control mechanism for starting and stopping said motor during each operating cycle, and actuating means for said locking means operated by said control mechanism to unlock and lock said device at the beginning and end respectively of each cycle of operation.

14. A power operator having, in combination with a closure member to be operated thereby, a driving motor, means providing a driving connection for transmitting the power of said motor to said closure member, a releasable element for starting said motor, electromagnetic means for tripping said element, and a lack for said closure member arranged to be actuated in the moving of said element.

15. The combination with a closure member, of a power driven element, means for maintaining a driving connection between said element and said closure member during normal operation and permitting detachment of the connection when a condition of overload is encountered, and means for preventing detachment of said connection when the closure member is in closed position.

16. A power operator having, in combination with a closure member to be operated, a motor operatively connected to the closure member, a releasable control element having two set positions and adapted when released from said positions to start and stop the motor respectively, locking means for said closure member, and means associated with said control element for moving said locking means into unlocking position in the movement of said control element from one of said positions and to move said locking means into locked position in the movement of said element from said other position.

17. A power driving unit having, in combination with a closure member to be driven thereby, a motor, a driving shaft driven by said motor, a driven shaft, releasable means normally providing a driving connection between said shafts, locking means for rendering said releasable means ineffective, a brake for said driving shaft, and means deriving power from said driven shaft for actuating said locking means and said brake.

18. A power operator having, in combination with a closure member to be operated, power means adapted to operate through predetermined operating cycles, means adapted to provide a driving connection between said power means and said closure member and including a releasable device normally maintaining said connection and adapted when released to permit movement of said closure member independently of said power means, setting means for said releasable device, locking means operable to prevent operation of said releasable device, and means operable near the end of each cycle of operation to actuate said setting means and then to move said locking means into locking position.

19. A power operator having, in combination with a closure member to be operated thereby, a driving motor, a driven shaft operatively connected to said closure member, means adapted to provide a driving connection between said motor and said shaft including a device adapted to be released under a condition of overload whereby to render said connection ineffectual, means operable to restore said device to operative position, locking means for preventing release of said device, control means for starting and stopping said motor, and means deriving power from said shaft to operate said restoring means and then to move said locking means into locking position and to operate said control means.

20. A power operator having, in combination with a closure member to be operated thereby, an electric motor, driving mechanism having a connection with said closure member and adapted to be driven by said motor, a switch for starting and stopping said motor in each cycle of operation, an overload release device included in said driving connection and adapted to render said connection ineffectual when a condition of overload is encountered, locking mechanism including a brake for said driving mechanism and means to prevent operation of the overload release device when the closure member is in closed position, a single controller for operating said brake, said switch and said last mentioned means, and means operable to actuate said controller.

21. A power operator having, in combination with a closure member to be operated thereby, an electric motor, driving mechanism having a connection with said closure member and adapted to be driven by said motor, a switch for starting and stopping said motor in each cycle of operation, a releasable device included in said driving connection and adapted to render said connection ineffectual when a condition of overload is encountered, means operable to reset said releasable device, locking mechanism for said closure member including a brake for said driving mechanism and means to prevent release of said device when the closure member is in closed position, and means deriving power from said motor during a cycle of operation to actuate said resetting means, said switch, said brake and said locking means.

22. A power operator for a door comprising, in combination, an elongated actuated member arranged for endwise reciprocation and connected to said door so as to alternately open and close the door upon movement in opposite directions, power driven means including an electric motor arranged to reciprocate said member, mechanism for controlling said motor including an element arranged to be oscillated in opposite directions near the ends of the alternate door operating cycles, and means for actuating said element from said member comprising a pair of cam members having surfaces extending in directions parallel to the path of movement of said actuating member and an arm having a lost motion connection with said element, the free end of said arm being positioned to be engaged by said cam members and to ride onto said surfaces as the actuating member reaches the limit of its travel in opposite directions, the lost motion of said connection permitting said arm to move back into the path of said cam members while said oscillatory element remains in actuated position.

23. A power operator for a door comprising, in combination, an elongated actuated member arranged for endwise reciprocation and connected to said door so as to alternately open and close the door upon movement in opposite directions, power driven means including an electric motor arranged to reciprocate said member, mechanism for controlling said motor including an element arranged to be oscillated in opposite directions near the ends of the alternate door operating cycles, and means for actuating said element from said member comprising a pair of cam members, an arm arranged to be engaged at its free end by said cam members and having a lost motion connection with said oscillatory element, which connection permits movement of said free end into the path of said cam members while the oscillatory element remains in one actuated position.

24. A power operator for a closure member combining an electric motor, a speed reducing gearing operatively connected to said closure member, a friction brake arranged to apply a retarding force to a relatively high speed member of said gearing, means operating automatically near the end of the opening and closing cycles of said member to effect application of said brake, a centrifugally acting clutch having its driving and driven elements connected respectively to the rotor of said motor and said gearing and acting automatically upon a decrease in the speed of its driven member produced by the initial application of said brake to disconnect said rotor from the rotating brake surface, thereby permitting the movement of said closure member to be arrested by said brake without overcoming the momentum of said rotor.

25. The combination of a door, locking means for the door, electrically driven means for operating the door, and mechanically operating means for operating said locking means and controlling the operation of said electrically driven means, said mechanically operating means including a device arranged to receive energy near the end of each operating cycle for use in initiating the succeeding cycle.

26. The combination with a door of an operator including an electric motor and adapted in successive operating cycles to open and close said door, means for locking said door in closed position, mechanically acting means arranged to receive energy from said motor during the door-closing cycle for actuating said locking means to unlock the door preliminary to the application of motive power to the door in the door-opening cycle of said operator.

27. The combination with a door of a power driven operator therefor, locking means for the door, and mechanism for operating said locking means including a member arranged to be set in a releasable position when said door is closed, a spring tending to move said member out of said position in a direction to unlock the door, a latch adapted when in active position to hold said member in set position against the action of said spring and when withdrawn to inactive position to permit said member to move and unlock said door preliminary to opening of the door by said operator, and means actuated automatically during closing of the door for setting said member in releasable position.

28. The combination with a door of a power driven operator therefor, locking means for the door, and mechanism for operating said locking means including a releasable member having a set position, energy-storing means tending to move said member away from set position, a latch for retaining said member in set position and withdrawable to release said member for movement by said energy-storing means in a direction to unlock said door, an electromagnet adapted when energized to withdraw said latch, and means actuated by said operator during the door-closing cycle for resetting said member relative to said latch.

In testimony whereof, I have hereunto affixed my signature.

HOWARD D. COLMAN.